(12) United States Patent
Brucker

(10) Patent No.: US 6,435,544 B1
(45) Date of Patent: Aug. 20, 2002

(54) OCCUPANT RESTRAINT SYSTEM FOR A VEHICLE

(75) Inventor: Roland Brucker, Schwäbisch Gmünd (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/607,376

(22) Filed: Jun. 30, 2000

(30) Foreign Application Priority Data

Jul. 9, 1999 (DE) ..................... 299 12 023 U

(51) Int. Cl.⁷ .............................................. B60R 21/22
(52) U.S. Cl. ..................................................... 280/730.2
(58) Field of Search .................. 280/728.1, 728.2, 280/730.2, 730.1; 296/214

(56) References Cited

U.S. PATENT DOCUMENTS

| | | | | |
|---|---|---|---|---|
| 5,755,457 A | * | 5/1998 | Specht ..................... | 280/728.2 |
| 5,921,575 A | * | 7/1999 | Kretschmer et al. ..... | 280/728.2 |
| 6,149,185 A | * | 11/2000 | White, Jr. et al. ....... | 280/728.2 |
| 6,155,594 A | * | 12/2000 | Ibe et al. ................. | 280/728.2 |
| 6,170,861 B1 | * | 1/2001 | Tietze ...................... | 280/730.2 |
| 6,179,324 B1 | * | 1/2001 | White, Jr. et al. ....... | 280/730.2 |
| 6,183,004 B1 | * | 2/2001 | Brucker .................... | 280/728.3 |
| 6,209,907 B1 | * | 4/2001 | Fischer .................... | 280/728.3 |

FOREIGN PATENT DOCUMENTS

| | | |
|---|---|---|
| DE | 19642964 A1 | 4/1998 |
| DE | 19738741 A1 | 3/1999 |

\* cited by examiner

*Primary Examiner*—Paul N. Dickson
*Assistant Examiner*—Faye M. Fleming
(74) *Attorney, Agent, or Firm*—Tarolli, Sundheim, Covell, Tummino & Szabo L.L.P.

(57) ABSTRACT

In an occupant restraint system for a vehicle that has a body structure which is covered internally by a lining, an inflatable gas bag is packed in a casing. The lining is provided with a recess. The casing extends along an edge of the recess and is in snug contact therewith. The casing is exposed or at the most is covered by a decorative cover foil or cover sheet. The major part of the casing is not covered by the lining. The casing may be demarcated evidently from the lining by design elements.

11 Claims, 1 Drawing Sheet

OCCUPANT RESTRAINT SYSTEM FOR A VEHICLE

The invention concerns an occupant restraint system for a vehicle, the body structure of which is covered internally by a lining.

BACKGROUND OF THE INVENTION

To an increasing extent, vehicles are being equipped with inflatable protective cushions not only in the front area but also laterally and in particular in the head- and shoulder area. The gas bag, which is packed or folded forming a gas bag package, is surrounded by a casing and is stowed with the casing under the lining of the body structure. Generally, one endeavors to hide the stowed gas bag behind the lining so that it is not visible. On the one hand, the lining part serving as covering for the stowed gas bag must have a sufficient mechanical strength so that it would not detach itself from the body structure, exposing a gap through which the gas bag package would become visible and accessible, but on the other hand it must yield and give way in a controlled manner on activation of the gas bag, so as not to hinder the deployment of the gas bag. It proves to be difficult and costly to fulfill both requirements at the same time.

SUMMARY OF THE INVENTION

The present invention provides an occupant restraint system with an inflatable gas bag which with reduced expenditure ensures an unimpeded deployment of the gas bag. According to the invention, this is achieved in that the lining is provided with a recess along the edge of which the casing of the gas bag package is in snug contact, which casing is exposed or at the most is covered by a decorative cover foil or cover sheet. The major part of the casing within the packed gas bag is not covered by the lining. In the occupant restraint system according to the invention, a conventional covering for the gas bag package, formed by a part of the lining, is dispensed with. This is based on the finding that with a suitable design the perception of the gas bag package or the casing, cover foil or cover sheet holding this together in no way has to be undesirable and the resulting appearance can even be used to specific objectives as a visual design element. An advantageous embodiment of the invention consequently consists in that the casing of the gas bag package is demarcated evidently from the lining by design elements.

The covering over the gas bag package, considered necessary in conventional occupant protection systems with an inflatable gas bag, is also a protection from damage to the gas bag. However, such a protection is not required when the gas bag is stowed at a less exposed site, in particular in the roof area of the vehicle. In the preferred embodiment of the invention, the gas bag package is therefore elongated and extends along a roof edge of the body structure between the roof edge and a roof lining.

BRIEF DESCRIPTION OF THE DRAWINGS

Further advantages and features of the invention will be apparent from the following description of an embodiment of the invention, with reference to the drawing. In the drawing.

DETAILED DESCRIPTION OF INVENTION

Figure 1:
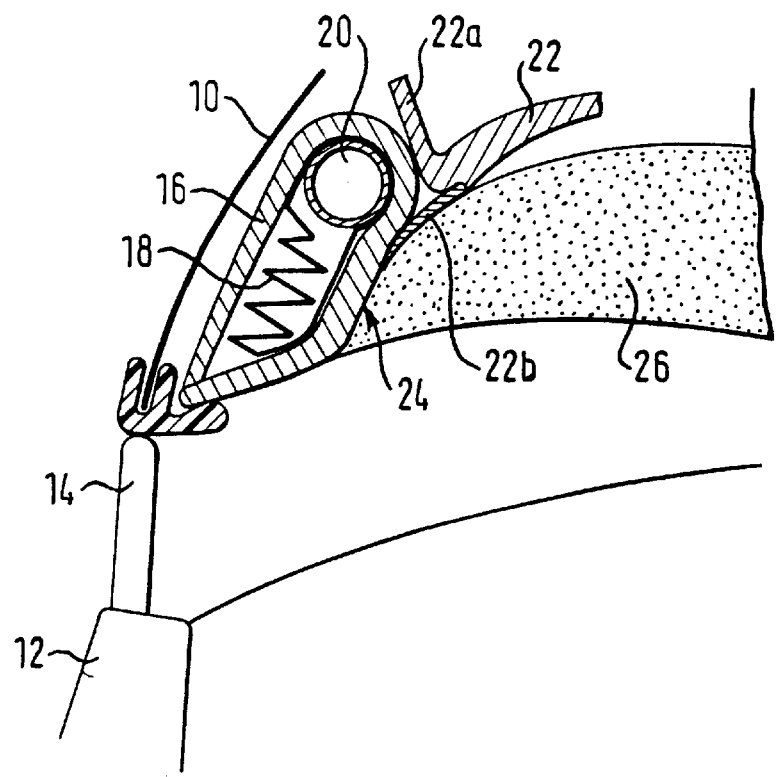
FIG. 1 shows a diagrammatic section in the region of the roof edge of a body structure.

In FIG. 1, a roof edge 10 of the body structure of a vehicle can be seen, with a side door 12 and a side window 14. Internally along the roof edge 10, an occupant protection system with an inflatable gas bag is arranged. This occupant protection system forms a preassembled module with a casing 16 formed by a section piece, with an inflatable gas bag 18 held therein in folded or placed-together state, and with a gas inlet pipe 20 which is arranged on the curved base of the casing 16 and is supported there. The roof of the body structure is covered internally by a roof lining 22. The roof lining 22, however, does not extend up to the roof edge, but rather forms a recess 24 along the roof edge, to receive the gas bag package with casing. The casing 16 can form a generally U-shaped shot-channel with two parallel arms connected by a curved base. The gas bag package inside the casing 16 can be held together by a foil or the like. The gas bag module arranged in the recess 24, in the preferred embodiment, is covered by a decorative cover sheet 26 between the lower margin of the roof edge and an upwardly-bent margin 22a of the roof lining 22. This cover sheet 26, however, does not have any mechanical protective function and is so flexible that it does not offer any appreciable resistance to the unfolding of the gas bag. This cover sheet 26 can be provided with decorative elements, can be printed, lacquered or structured decoratively. The roof lining 22 can be provided in addition with an elastic lip 22b which covers the upper rim of the cover sheet 26 so that no joint appears between the margin of the roof lining 22 and the gas bag module.

Figure 2:
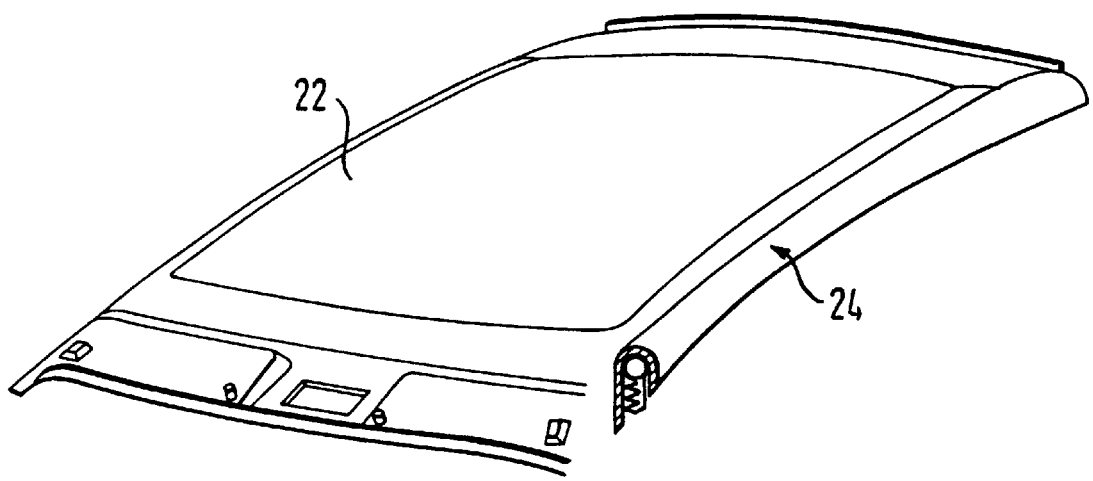
FIG. 2 shows a diagrammatic perspective view of a roof lining with a head protection gas bag arranged along a longitudinal side.

As indicated in FIG. 2, the gas bag modules are evidently visibly apparent along the two side margins of the roof lining 22. For repair and replacement, the gas bag modules are easily accessible. Also the installation of the gas bag modules is substantially simplified compared with conventional solutions.

In accordance with a further embodiment, the casing 16 forms an integral part of the roof lining 22.

What is claimed is:

1. An occupant restraint system for a vehicle that has a roof and a side structure, said side structure extending perpendicularly to said roof and including at least one side door and at least one side window, said system comprising:
   a lining which only lines said roof and does not line any of said side structure;
   at least one inflatable gas bag stored in a packed condition within a casing, said casing having an elongated profiled body and a cross-section with two arms connected by a curved base,
   said roof lining comprising an edge portion being in snug contact with said curved base of said casing, and said casing not being covered by said roof lining.

2. The occupant restraint system according to claim 1, wherein said casing is covered by a decorative cover sheet having design elements and which said roof lining does not have said design elements.

3. The occupant restraint system according to claim 1, wherein a roof edge is located between said side structure and said roof and a recess is defined by said roof lining and said roof edge.

4. The occupant restraint system according to claim 3, wherein said casing extends along said roof edge and in said recess.

5. The occupant restraint system of claim 4, wherein said casing forms an integral part of said roof lining.

6. The occupant restraint system according to claim 4, wherein said roof lining has an upwardly-bent support rim lying against said casing.

7. The occupant restraint system according to claim 3, wherein said roof lining has a resilient marginal lip lying against said casing.

8. The occupant restraint system according to claim 1, wherein a gas inlet pipe is supported internally on said curved base of said profiled body.

9. An occupant restraint system for a vehicle that has a roof and a side structure, said side structure extending perpendicularly to said roof and including at least one side door and at least one side window, said system comprising:
- a lining which only lines said roof and does not line any of said side structure;
- at least one inflatable gas bag stored in a packed condition within a casing, said packed gas bag being elongated and extending along a roof edge between said roof and said side structure and in a recess defined by said roof lining and said roof edge,
- said recess having an edge along which the casing is in snug contact,
- a major part of said casing not being covered by said roof lining,
- said casing contrasting with said roof lining by design elements, and
- said roof lining having a resilient marginal lip lying against said casing.

10. An occupant restraint system for a vehicle that has a roof and a side structure, said side structure extending perpendicularly to said roof and including at least one side door and at least one side window, said system comprising:
- a lining which only lines said roof and does not line any of said side structure;
- at least one inflatable gas bag stored in a packed condition within a casing, said packed gas being elongated and extending along a roof edge located between said roof and said side structure and in a recess defined by said roof lining and said roof edge,
- said recess having an edge along which the casing is in snug contact,
- a major part of said casing not being covered by said roof lining,
- said casing contrasting with said roof lining by design elements, and
- said roof lining having an upwardly-bent support rim lying against said casing.

11. An occupant restraint system for a vehicle with a roof and a side structure, said side structure extending perpendicularly to said roof and including at least one side door and at least one side window, said system comprising:
- a lining which only lines said roof and does not line any of said side structure;
- at least one inflatable gas bag stored in a packed condition within a casing,
- a roof edge being located between said side structure and said roof and a recess being defined between said roof lining and said roof edge,
- said casing being located adjacent said roof lining and along said roof edge in said recess, said casing having an elongated profiled body and a cross-section with two arms connected by a curved base, said casing being fastened to said vehicle without being fastened to said roof lining,
- said roof lining having a portion engaging said curved base of said casing without covering any of said casing.

* * * * *